United States Patent [19]
Judson

[11] 3,992,945
[45] Nov. 23, 1976

[54] BOURDON PRESSURE GAUGE HAVING DIRECT-COUPLED ELECTRONIC AND VISUAL READOUT

[75] Inventor: Sherwood P. Judson, Fairfield, Conn.

[73] Assignee: American Chain & Cable Company, Inc., Bridgeport, Conn.

[22] Filed: June 5, 1975

[21] Appl. No.: 583,889

[52] U.S. Cl. .............................. 73/398 AR; 73/411; 338/40
[51] Int. Cl.[2] ....................... G01L 9/02; G01L 7/04
[58] Field of Search ..................... 338/40, 112, 114; 73/411–418, 398 AR, 389

[56] References Cited
UNITED STATES PATENTS

| | | | |
|---|---|---|---|
| 1,986,695 | 1/1935 | Warner | 338/40 |
| 2,752,558 | 6/1956 | Kane | 338/114 |
| 3,068,700 | 12/1962 | Bourns | 73/398 C |
| 3,123,791 | 3/1964 | Roche et al. | 73/398 AR |
| 3,599,493 | 8/1971 | Thomas | 73/411 |
| 3,629,774 | 12/1971 | Crites | 338/114 |

Primary Examiner—Donald O. Woodiel
Attorney, Agent, or Firm—Pennie & Edmonds

[57] ABSTRACT

A Bourdon pressure gauge is provided with a direct-coupled electronic and visual readout. Specifically, the electronic and visual readouts are direct-coupled in that they are taken along a common linkage from the Bourdon tube. In addition, they are of comparable accuracy because the electrical readout is taken at a point of relatively small displacement amplification on the commmon linkage whereas the visual readout is taken at a point of substantial displacement amplification. In a preferred embodiment, the Bourdon tube is linked to a pivotally mounted linkage element having a cam head for driving a helicoidal gear. An electrical contact in cooperation with resistor disposed on the pivotally mounted element is used to take a variable resistance electrical readout, and a pointer for taking a visual readout is connected to the helicoidal gear. Circuitry is provided for producing an electrical current proportional to the pressure sensed by the tube, and the visual readout provides a readily accessible check on the accuracy of the electrical readout.

8 Claims, 5 Drawing Figures

BOURDON PRESSURE GAUGE HAVING DIRECT-COUPLED ELECTRONIC AND VISUAL READOUT

BACKGROUND OF THE INVENTION

1. Field of the Invention

The present invention relates to Bourdon pressure gauges. More specifically, it relates to a Bourdon pressure gauge having a direct-coupled electronic and visual readout.

2. Description of the Prior Art

Conventional Bourdon tube pressure gauges typically use a rotating pointer to provide visual readout. Generally, a Bourdon tube is positioned in an arcuate configuration with one fixed end in communication with a source of pressure to be measured and the other end free to move in response to flexing of the tube as caused by changes in such pressure. These gauges are provided with a pressure dial; and suitable linkage is included for connecting the free end of the Bourdon tube for indicating the changes in pressure sensed by the tube. Typically, the linkages and the length of the pointer provide a circumferential displacement of the pointer tip which is considerably amplified in comparison with the displacement of the tube end. By varying the tube design, gauges may be specifically constructed for measuring pressures ranging from 0 to 15 p.s.i. or for measuring pressures ranging from 0 to as high as 20,000 p.s.i. The main structural features of a rotating pointer Bourdon tube pressure gauge are illustrated in U.S. Pat. No. 3,504,548, issued to E. H. Grauel.

Similar gauges have been devised for providing an electrical readout. See, for example, U.S. Pat. No. 2,956,251, issued to E. J. Groeppinger et al., and U.S. Pat. No. 3,411,362, issued to J. Arasim, Jr. These gauges, in substance, use a rotating pointer to contact a variable resistor. In both cases, the displacements of the pointer ends which effect the contact are relatively large compared to the displacements of the tube. An alternative electrical readout gauge is described in U.S. Pat. No. 2,934,729, issued to M. E. Bourns. In this gauge, the free end of the Bourdon tube is directly connected to a contact with the variable resistor.

One of the major difficulties with electrical readout gauges is the fact that the addition of relatively complex circuitry between the mechanical sensing element and the readout introduces an additional source of error not readily perceived by the user. Circuits containing semiconductor devices such as transistors can produce an output which varies as a function of temperature or which gradually varies as a function of time. In remote sensors, even the length of the transmission line between the circuitry and its remote indicator may be a source of error.

These errors are not readily perceived because they arise in the circuitry rather than in the simple mechanical structure of the gauge. Electrical readout gauges do not typically have visual readout indicators against which the electrical readout can be checked, and the structures of such gauges are not readily adapted for providing, simultaneously, electronic and visual readouts that are directly coupled and of comparable accuracy. In general, such gauges have been designed to utilize the relatively small displacements as are required to confine the contact to regions of uniform resistivity. These displacements are too small to provide meaningful visual readouts.

SUMMARY OF THE INVENTION

In accordance with the present invention, a Bourdon pressure gauge is provided with a direct-coupled electronic and visual readout. Specifically, the electronic and visual readouts are direct-coupled in that they are taken along a common linkage from the Bourdon tube. In addition, they are of comparable accuracy because the electronic readout is taken at a point of relatively small displacement on the common linkage, whereas the visual readout is taken at a point of substantial displacement amplification. In a preferred embodiment, the Bourdon tube is linked to a pivotally mounted linkage element having a cam head for driving a helicoidal gear. An electrical contact in cooperation with a resistor disposed on the pivotally mounted element is used to take a variable resistance electrical readout, and a pointer for taking a visual readout is connected to the helicoidal gear. Circuitry is provided for producing an electrical current proportional to the pressure sensed by the tube, and the direct-coupled visual readout provides a readily accessible check on the accuracy of the electrical readout.

BRIEF DESCRIPTION OF THE DRAWINGS

The advantages, nature, and various features of the invention will appear more fully upon consideration of the illustrative embodiment now to be described in detail in connection with the accompanying drawings. In the drawings.

For convenience of reference, the same reference numbers are used for the same components throughout the drawings.

DETAILED DESCRIPTION

Mechanical Structure and Operation

Figure 1:
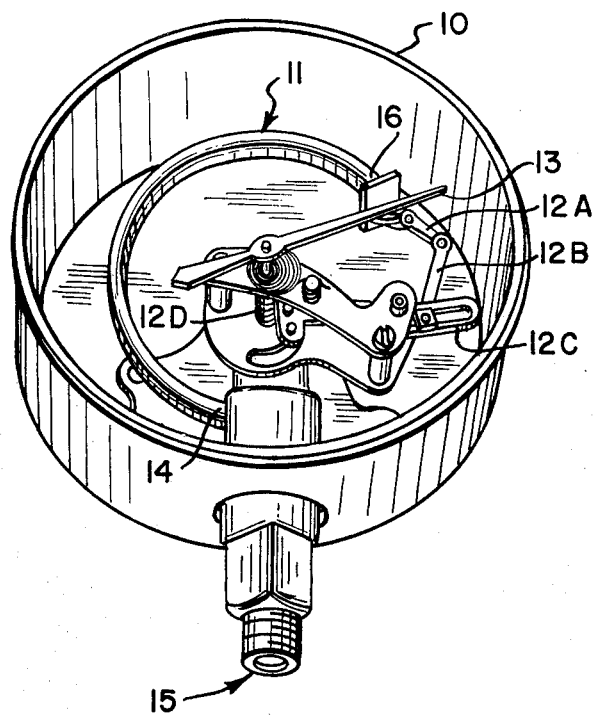
FIG. 1 is a perspective front view of a Bourdon gauge in accordance with the invention with the dial face removed.

Referring to the drawings, FIG. 1 illustrates a portion of a Bourdon pressure provided with a direct-coupled electronic and visual readout in accordance with the invention. Specifically, the gauge comprises a housing 10, a flexible Bourdon tube 11, and linkage means comprising a train of linkage elements 12A through 12D mechanically coupling the Bourdon tube to visual indicator means such as a pointer 13, and electrical contact means (not visible in this figure). The linkage elements 12A through 12D can be levers, gears or any other compact mechanical coupling devices.

Figure 2:
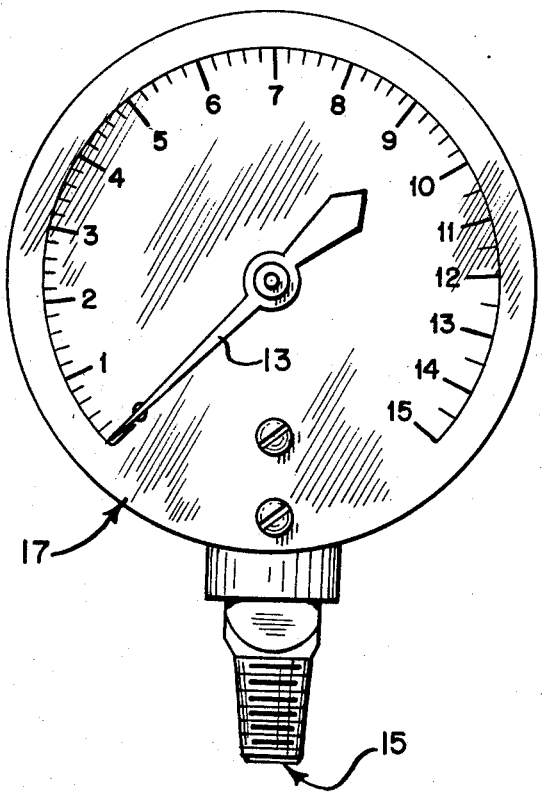
FIG. 2 is a front view of the gauge showing the calibrated visual, readout dial.

The visible portion of the gauge shown in FIG. 1 is conventional construction. The Bourdon tube 11 is formed in a circular configuration and has a fixed end 14 communicating with a source 15 of pressure to be measured. The free end 16 is connected to the pointer 13 through the linkage train. Upon changes in pressure, the radius of the Bourdon tube will be caused to change. With an increase of pressure, the radius will increase and with a decrease in pressure, the radius will decrease. Also, with this change in the configuration of the Bourdon tube, its free end 16 will be caused to move and thus cause displacement of the pointer 13 in a displacement path around the calibrated pressure dial 17 shown in FIG. 2. The dial is calibrated in accordance with the movement of the Bourdon tube in order to show the pressures being sensed thereby.

Figure 3:
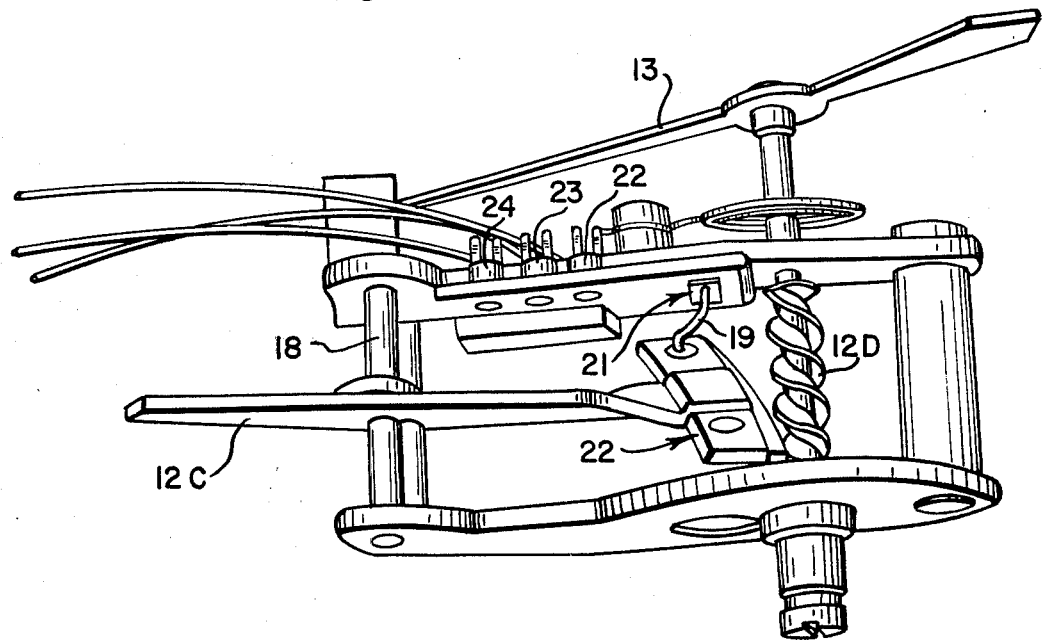
FIG. 3 is a perspective side view of a portion of the gauge.

As shown in FIG. 3, which is a perspective side view of a portion of the gauge, a linkage element 12C of the gauge is pivotally mounted on a support bracket 18. One end of pivotally mounted linkage element 12C is connected to Bourdon tube by elements 12A and 12B, and the other end of pivotally mounted element 12C includes an electrical contact 19 mounted in electrically coupled relationship with variable resistor 21 which is disposed along the displacement path of the contact. The latter end of element 12C also includes a cam head 22 mechanically coupled to linkage element 12D, a helicoidal gear, which, in turn, is connected to pointer 13.

In operation, both visual and electronic readouts are taken along the common train of linkages 12A through 12D. Specifically, the movement of the Bourdon tube, through linkage elements 12A and 12B, rotates pivotally mounted linkage element 12C. The rotation of element 12C, through the motion of cam head 22, rotates helicoidal gear 12D, and through this gear, pointer 13 is rotated. The position of the pointer tip on the circumference of calibrated dial 17 provides a measure of the sensed pressure. In addition, the rotation of pivotally mounted element 12C displaces contact 19 along variable resistor 21, effecting a change in resistance proportional to the movement of the tube. The resulting change in resistance can be sensed and used to generate and electrical output signal proportional to the sensed pressure.

This structure and operation of the pressure gauge simultaneously provides accurate, direct-coupled electronic and visual readouts. The electronic readouts are accurate because they are taken at a point on the linkage chain where there is relatively little amplification of the tube displacement. Consequently, a variable resistor of relatively small dimension can be used. In typical applications, the contact moves only about one-half inch for full-scale deflection of the free end of the tube (approximately one-quarter inch), and for such dimensions conductive plastic resistors can be obtained which are uniform to one-quarter of one percent.

At the same time, the visual readout is taken at a point on the linkage chain providing relatively high amplification of the tube displacement as compared to the amplification at the contact. In typical applications, the pointer tip moves approximately 6 inches for full-scale deflection, reflecting a displacement amplification of more than a factor of 10 over both the displacement of the free end and the displacement of the contact. This relatively greater displacement amplification permits visually significant spacing between adjacent calibration marks on the dial, permitting visual readouts on a scale comparable to the accuracy of electrical readouts taken from the resistor. Moreover, as both the electronic and visual readouts are taken along a common linkage, the visual readout becomes a readily accessible check on the performance of the electronic circuitry.

Electrical Structure and Operation

In a preferred embodiment, the variation in resistance of variable resistor 21 is sensed by a bridge circuit and converted into a current proportional to the pressure sensed by the Bourdon tube for transmission to a remote indicator. In this embodiment, the two ends of variable resistor 21 and the contact 19 are applied to the output circuitry through terminals 22, 23, and 24, respectively.

Figure 4:
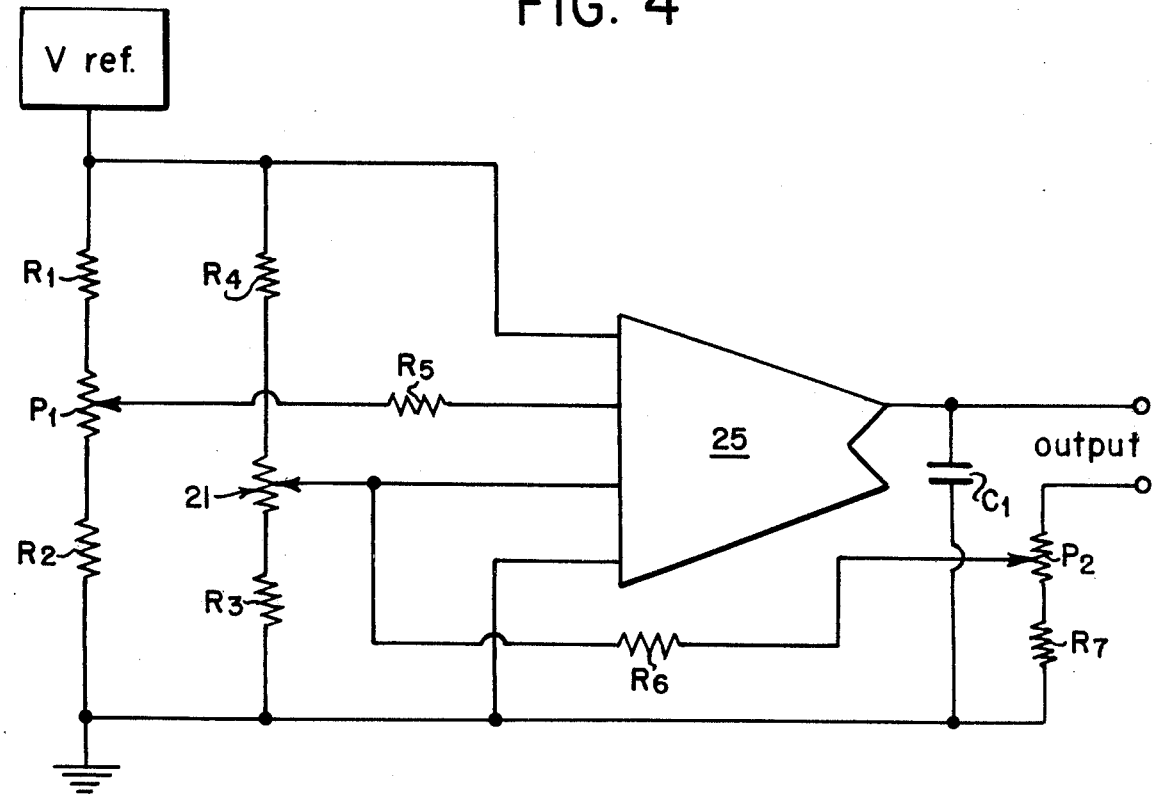
FIG. 4 is a schematic circuit diagram illustrating the electrical readout circuitry.

FIG. 4 is a schematic circuit diagram illustrating the output circuitry. In substance, the output circuit comprises a bridge circuit, including variable resistor 21 and resistors $R_1$, $R_2$, and $R_3$, and a power supply, V ref., all balanced at zero pressure. The bridge circuit is coupled to a linear integrated circuit 25 for converting a voltage proportional to the degree of bridge imbalance into a proportional current, preferably in the range between 4 and 20 milliamps. Such an integrated circuit is marketed by the National Semiconductor Corporation, Santa Clara, Cal., under the product name LH 0045 Two Wire Transmitter. The features and operation of the integrated circuit block are described in detail in the National Semiconductor Corporation Brochure, LH 0045/LH 0045, "Two Wire Transmitter" (November 1973).

In the circuit of FIG. 4, potentiometers $P_1$ and $P_2$ provide means for adjusting the null and the span of the output current, respectively.

In the preferred embodiment, the circuit elements have the following values:

| Circuit Element | |
|---|---|
| Vref | 5.1 volts |
| $R_1$ | 4 kilohms |
| $P_1$ | 1 kilohm potentiometer |
| $R_2$ | 4 kilohms |
| 21 (variable resistor) | 0–1 kilohm (conductive plastic manufactured by Computer Instruments Corp., Long Island, New York.) |
| $R_3$ | 2.37 kilohms |
| $C_1$ | 4.7 microfarads |
| $R_4$ | 6.15 kilohms |
| $R_5$ | 1 megohm |
| $P_2$ | 20 ohm potentiometer |
| $R_6$ | 1.66 megohms |
| $R_7$ | 53.3 ohms |

Figure 5:
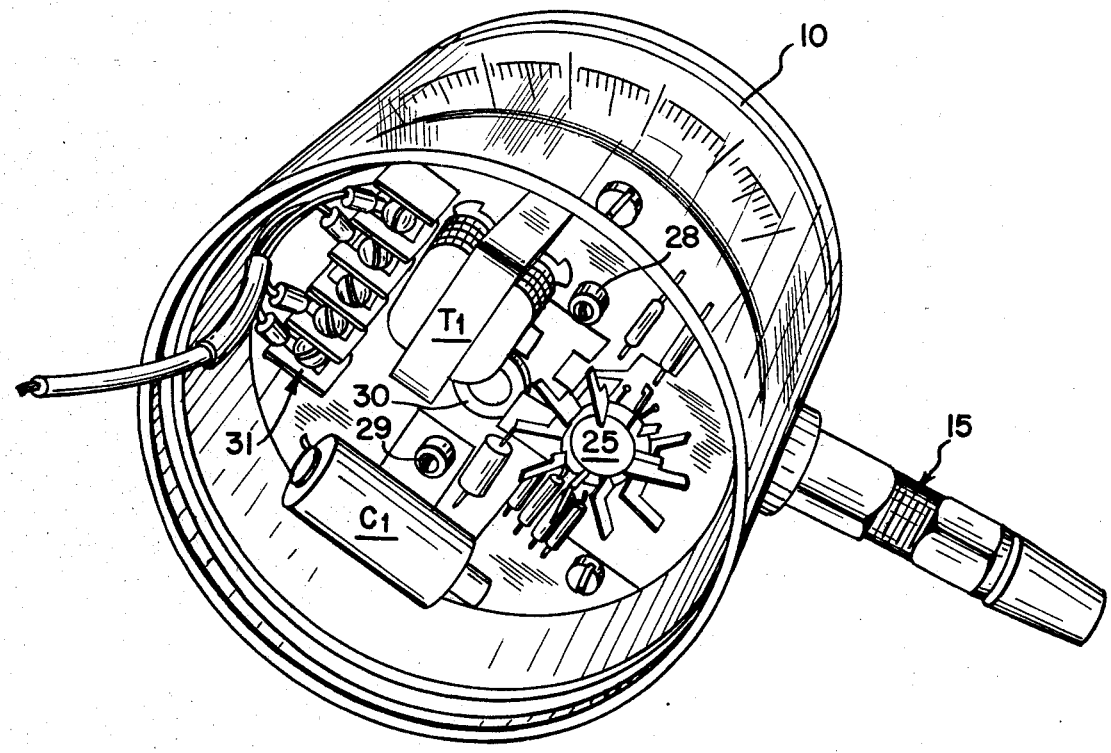
FIG. 5 is a back view of the gauge showing the electrical readout circuit components.

FIG. 5, which is a back view of the gauge with the back plate removed, shows a preferred arrangement of the major circuit components. Transformer $T_1$ comprises the power supply transformer and knobs 28 and 29 permit adjustment of potentiometers $P_1$ and $P_2$ for adjusting the null and span of the current output. Knob 30, coupled to the helicoidal gear, permits adjustment of the mechanical null, and output terminal block 31 provides the means for connecting the output circuitry with two-wire transmission lines.

While the invention has been described in connection with a specific embodiment, it is understood that this embodiment is merely illustrative of the many possible specific embodiments which can represent applications of the principles of the invention. Numerous and varied other arrangements can be made by those skilled in the art without departing from the spirit and scope of the invention.

I claim:

1. A Bourdon pressure gauge having a direct-coupled electronic and visual readout comprising:

a. a Bourdon tube having a fixed end communicating with a source of pressure to be measured and a free end connected to linkage means for mechanically coupling said free end to electrical contact means and visual indicator means;

b. visual indicator means displaceable along a displacement path in response to the movement of said free end connected to said linkage means at a position of relatively large displacement amplification as compared to the displacement of said free end;

c. a pressure dial disposed along said displacement path of said visual indicator means, said dial being calibrated to indicate the values of pressure sensed by said Bourdon tube;

d. electrical contact means displaceable along a displacement path in response to the movement of said free end connected to said linkage means at a position of relatively small displacement amplification as compared to the displacement of said visual indicator means; and e. a variable resistor disposed along said displacement path of said electrical contact means and in electrical contact therewith, said variable resistor being electrically coupled to circuit means for providing an electrical output indicative of the values of pressure sensed by said Bourdon tube.

2. A pressure gauge according to claim 1 wherein said circuit means comprises circuit means for providing an output current proportional to the pressure sensed by said Bourdon tube.

3. A pressure gauge according to claim 1 wherein said variable resistor is conductive plastic.

4. A pressure gauge according to claim 1 wherein said circuit means comprises a bridge circuit including said variable resistor for producing a voltage proportional to the displacement of said electrical contact means along said variable resistor and circuit means for producing a current output proportional to said voltage.

5. A pressure gauge according to claim 1 wherein the displacement of said visual indicator means exceeds the displacement of both said free end and said electrical contact means by a factor of at least 10.

6. A pressure gauge according to claim 1 wherein:

a. said linkage means includes a linkage element mounted for movement along a predetermined path in response to movement of the free end of the Bourdon tube; and b. said visual indicator means and electrical contact means are both operatively connected to said linkage element for movement along their respective displacement paths in response to movement of said linkage element along said predetermined path.

7. A pressure gauge according to claim 1 wherein:

a. said linkage means includes a linkage element mounted for pivoting movement about a fixed axis in response to movement of the free end of the Bourdon tube; and b. said visual indicator means and electrical contact means are both operatively connected to said linkage element for movement along their respective paths in response to pivoting movement of said linkage elements.

8. A Bourdon pressure gauge having a direct-coupled electronic and visual readout comprising:

a. a Bourdon tube having a fixed end communicating with a source of pressure to be measured and a free end connected to linkage means for mechanically coupling said free end to electrical contact means and visual indicator means;

b. visual indicator means displaceable along a displacement path in response to the movement of said free end connected to said linkage means at a position of relatively large displacement amplification as compared to the displacement of said free end;

c. a pressure dial disposed along said displacement path of said visual indicator means, said dial being calibrated to indicate the values of pressure sensed by said Bourdon tube;

d. electrical contact means displaceable along a displacement path in response to the movement of said free end connected to said linkage means at a position of relatively small displacement amplification as compared to the displacement of said visual indicator means;

e. a variable resistor disposed along said displacement path of said electrical contact means and in electrical contact therewith, said variable resistor being electrically coupled to circuit means for providing an electrical output indicative of the values of pressure sensed by said Bourdon tube;

f. said linkage means comprises a train of linkage elements including a helicoidal gear and a pivotally mounted linkage element having a cam head for driving said helicoidal gear;

g. said visual indicator means is a pointer connected to said helicoidal gear; and h. said electrical contact means is connected to said pivotally mounted linkage element.

* * * * *

UNITED STATES PATENT AND TRADEMARK OFFICE
CERTIFICATE OF CORRECTION

PATENT NO. : 3,992,945
DATED : November 23, 1976
INVENTOR(S) : Sherwood P. Judson It is certified that error appears in the above—identified patent and that said Letters Patent are hereby corrected as shown below:

Column 2, line 50, "pressure provided" should read --pressure gauge provided--.

Column 4, line 26, "/LH 0045" second occurrence should read -- /LH 0045C --.

Signed and Sealed this

Twenty-fourth Day of May 1977

[SEAL]

Attest:

RUTH C. MASON
Attesting Officer

C. MARSHALL DANN
Commissioner of Patents and Trademarks